(12) United States Patent
Kuk

(10) Patent No.: US 11,724,218 B2
(45) Date of Patent: Aug. 15, 2023

(54) BACKWASH SUCTION DEVICE OF FIBROUS FILTER

(71) Applicant: GRENEX Limited, Seoul (KR)

(72) Inventor: Chungchang Kuk, Seoul (KR)

(73) Assignee: GRENEX LIMITED, Seoul (KR)

( * ) Notice: Subject to any disclaimer, the term of this patent is extended or adjusted under 35 U.S.C. 154(b) by 99 days.

(21) Appl. No.: 17/575,692

(22) Filed: Jan. 14, 2022

(65) Prior Publication Data
US 2023/0032256 A1 Feb. 2, 2023

(30) Foreign Application Priority Data
Jul. 27, 2021 (KR) .................. 10-2021-0098846

(51) Int. Cl.
*B01D 33/50* (2006.01)
*B01D 33/46* (2006.01)

(52) U.S. Cl.
CPC ......... *B01D 33/503* (2013.01); *B01D 33/465* (2013.01); *B01D 2201/082* (2013.01)

(58) Field of Classification Search
None
See application file for complete search history.

(56) References Cited

U.S. PATENT DOCUMENTS

| | | | | |
|---|---|---|---|---|
| 2,932,402 A * | 4/1960 | Logne | ............... | D21D 5/046 210/407 |
| 3,945,924 A * | 3/1976 | Peterson | ............... | B01D 33/23 210/384 |
| 4,166,034 A * | 8/1979 | Bodine | ............... | B01D 33/801 210/384 |
| 4,946,602 A * | 8/1990 | Ekberg | ............... | B01D 33/46 134/1 |
| 10,905,984 B2 * | 2/2021 | Landwehr | ............... | B01D 33/62 |
| 2017/0157541 A1 * | 6/2017 | Landwehr | ............... | B01D 29/80 |
| 2021/0283537 A1 * | 9/2021 | Kuk | ............... | B01D 33/21 |
| 2023/0032256 A1 * | 2/2023 | Kuk | ............... | B01D 33/503 |

FOREIGN PATENT DOCUMENTS

| | | |
|---|---|---|
| KR | 10-1791863 B1 | 11/2017 |
| KR | 10-2018-0020500 A | 2/2018 |
| KR | 10-2183820 B1 | 11/2020 |

\* cited by examiner

*Primary Examiner* — Robert J Popovics
(74) *Attorney, Agent, or Firm* — Bacon & Thomas, PLLC

(57) ABSTRACT

An incised surface is formed in one surface of a suction plate on the basis of a slit and a pattern roller is placed in a room, which is provided at a thickness part of the slit in which the incised surface is formed, to rotate in place so that the pattern roller partially protrudes outward from the incised surface and forms patterns on a surface of fleeces which are backwashed while passing through the slit so as to increase a filtration area of the fleeces. The backwash may be performed and the filtration area of the fleeces may be increased using the room. The spline-shaped patterns including splines cut to a certain length, patterns including several annular protrusions formed on an outer circumference of the pattern roller, spline-shaped patterns formed on the outer circumference, lattice-shaped patterns, and the like may be formed on a surface of the pattern roller.

4 Claims, 10 Drawing Sheets

BACKWASH SUCTION DEVICE OF FIBROUS FILTER

CROSS-REFERENCE TO RELATED APPLICATION

This application claims priority to and the benefit of Korean Patent Application No. 10-2021-0098846 filed Jul. 27, 2021, the disclosure of which is incorporated herein by reference in its entirety.

FIELD OF THE INVENTION

The present invention relates to a backwash suction device of a fibrous filter and, more particularly, to increasing filtration efficiency by forming an incised surface by cutting one side of a surface of a suction plate, which is exposed outward, on the basis of a slit to a predetermined thickness and then mounting a pattern roller in a room provided in the incised surface to form a variety of shapes of patterns on a fleece surface backwashed while passing through the slit so as to increase a filtration area using the patterns without pushing the surface of the fleeces to form a surface of a disc-type filter after being backwashed. Also, at least one of patterns including splines formed to be lengthwise in a longitudinal direction thereof while each spline is cut to a certain length, patterns including annular protrusions formed at predetermined intervals on an outer circumference of the pattern roller, spline-shaped patterns formed to be lengthwise in a longitudinal direction on an outer circumferential surface, and lattice-shaped patterns including repeated uneven parts is formed on an outer surface of the pattern roller so as to increase a filtration area by forming a variety of shapes of patterns on a fleece surface that is pushed after being backwashed.

BACKGROUND OF THE INVENTION

Generally, a fibrous filter includes fiber (fleeces) on a surface of a disc-shaped filter so as to filter out foreign matter using the fleeces while contaminated water or the like passes through the fiber and flows into the disc-type filter. In the fibrous filter, a backwash suction device configured to suction and remove foreign matter stuck to a surface of a fibrous disc filter using a backwash manner is mounted like the following patent documents 1 to 3.

Patent Document 1: Korean Patent Registration No. 10-2183820

Patent Document 1 relates to a backwash suction device of a fibrous filter and is configured to increase each rotation amount of fleeces by forming an edge surface of a suction slit through which the fleeces move outward to be a tilted surface and allowing the fleeces suctioned in the suction slit while a fibrous disc filter rotates to come into contact with the tilted surface so as to increase a backwash effect. Also, since several frictional protrusions are formed on the tilted surface to protrude therefrom, the fleeces surpass the frictional protrusions one by one to be scrubbed on and rub with a washboard so as to further increase an effect of removing foreign matter.

Patent Document 2: Korean Patent Publication No. 10-2018-0020500

Patent Document 2 is directed to providing a suction box for a backwash device of a fibrous filter in which parts of a body and a suction plate which come into contact with each other are formed to be coupled to each other in an uneven shape to prevent a fluid leakage without a sealing member, and the body and the suction plate are configured to be coupled to each other using a hook type so as to reduce manufacturing time and cost as well as production cost by decreasing the number of components. Particularly, Patent Document 2 is also directed to providing a suction box for a backwash device of a fibrous filter which is configured to easily and quickly mass-produce a complicated shape and to reduce manufacturing time and costs of components by injection-molding the body and the suction plate using plastic.

Patent Document 3: Korean Patent Registration No. 10-1791863

Since a suction nozzle is generally spaced apart from a disc while filtration is performed and a fluid sprayed through a spray nozzle rotates the suction nozzle to come into contact with a medium filter of the disc to perform backwash, frictional resistance between the medium filter and the suction nozzle is reduced so as to increase a filtration effect and prevent abrasion or damage of the medium filter or the suction nozzle when filtration is performed, and on the other hand, the suction nozzle is allowed to come into contact with the medium filter so as to increase a backwash effect when backwash is performed. Particularly, since a support bar which rotatably supports the suction nozzle is caught by a stopper to be spaced at a predetermined interval apart from the disc, durability of the disc may be increased by preventing the suction nozzle from functioning as frictional resistance when the disc rotates and a problem that suction performance is degraded due to suctioning many fibers in the suction nozzle may be solved.

Here, as shown in FIGS. 1 and 2, a backwash suction device 10 is installed in a filtration tank T to be pressed against a surface of each disc-type filter 20 installed to rotate in place and removes foreign matter stuck to fleeces 21 included in the disc-type filter 20 by suctioning the fleeces 21 when the fleeces 21 included in the disc-type filter 20 are suctioned in to filter out waste water. The backwash suction device 10 includes a suction body 10' having a container shape to suction and discharge foreign matter removed from the fleeces 21 outward from the filtration tank T and a suction plate 10" configured to close an open inlet part of the suction body 10' and installed to face a surface of the disc-type filter 20 rotating in place. Also, the suction plate 10" includes a slit 11 formed to suction the fleeces 21 exposed outward in the suction body 10' and remove foreign matter as the disc-type filter 20 rotates.

Referring to FIG. 2, in the backwash suction device 10, the following problems occur.

(1) The fleeces 21 included in the surface of the disc-type filter 20 which moves while being pressed against a surface of the suction plate 10" move while being pressed against the suction plate 10" and then are suctioned in the slit 11 to be spread out so that foreign matter stuck to a surface thereof is suctioned in the suction body 10' to perform backwash.

(2) Here, the fleeces 21 backwashed in the slit 11 are caught between the suction plate 10" and the disc-type filter 20 as the disc-type filter 20 continuously rotates. The filtration is performed while the fleeces 21 are laid on and pressed against the surface of the disc-type filter 20 so that a limitation occurs in filtration performance of the fibrous filter.

(3) That is, the filtration performance of the fibrous filter is determined depending on a filtration area of the disc-type filter 20. Here, since the fleeces 21 formed on the surface of the existing disc-type filter 20 are being pushed by the suction plate 10", a surface of the fleeces 21 is pushed against the disc-type filter 20 to be flat such that there is a limitation in increasing a filtration area.

(4) Accordingly, in order to treat the same amount of waste water, the number of the disc-type filters 20 being mounted increases and manufacturing costs or maintenance and repair costs also increase due to the increase in the number of the disc-type filters 20.

PATENT DOCUMENTS

Patent Document 1: Korean Patent Registration No. 10-2183820 (registered on Nov. 23, 2020)
Patent Document 2: Korean Patent Publication No. 10-2018-0020500 (published on Feb. 28, 2018)
Patent Document 3: Korean Patent Registration No. 10-1791863 (registered on Oct. 25, 2017)

SUMMARY OF THE INVENTION

The present invention is directed to providing a backwash suction device of a fibrous filter in which an incised surface is formed by cutting one surface of a suction plate on the basis of a slit, a room is provided in a thickness part of the slit in which the incised surface is formed, and then a pattern roller is mounted in the room to rotate in place while partially protruding outward from the incised surface so that patterns are formed on a fleece surface that is backwashed while passing through the slit using the pattern roller and thus a filtration area of the fleeces increases so as to increase filtration efficiency of the fibrous filter.

The present invention is also directed to providing a backwash suction device of a fibrous filter in which, since a room is formed to be spaced at a certain distance apart from a slit in an incised surface, a filtration area of fleeces is increased in addition to providing a backwash effect using the room so as to further increase filtration efficiency of the fibrous filter.

The present invention is also directed to providing a backwash suction device of a fibrous filter in which at least one of patterns including splines formed to be lengthwise in a longitudinal direction thereof while each spline is cut to a certain length, patterns including several annular protrusions formed at predetermined intervals on an outer circumference of the pattern roller, spline-shaped patterns formed to be lengthwise in a longitudinal direction on an outer circumferential surface, and lattice-shaped patterns including repeated uneven parts is formed on a surface of the pattern roller so as to further increase a filtration area of a fleece surface using the patterns.

According to an aspect of the present invention, there is provided a backwash suction device of a fibrous filter. The backwash suction device includes a suction body (100) having a container shape and including a drain hole (110) to discharge content from inside the suction body (100) outward and a suction plate (200) mounted in the suction body (100) to close an inlet part thereof and including a slit (210) formed to perform backwash. Here, an incised surface (230) is formed in the suction plate (200) by cutting one side of a surface exposed outward on the basis of the slit (210) to a predetermined thickness (W), a room (220) is provided by cutting a part of a thickness of the slit (210) in which the incised surface (230) is formed, and a pattern roller (300) is mounted in the room (220) to rotate in place while being partially exposed and protruding outward from the incised surface (230) so as to form patterns on a surface of fleeces F which have passed through the slit (210).

Another aspect of the present invention, there is provided a backwash suction device of a fibrous filter. The backwash suction device includes a suction body (100) having a container shape and including a drain hole (110) to discharge content from inside the suction body (100) outward and a suction plate (200) mounted in the suction body (100) to close an inlet part thereof and including a slit (210) formed to perform backwash. Here, an incised surface (230) is formed in the suction plate (200) by cutting one side of a surface exposed outward on the basis of the slit (210) to a predetermined thickness (W), a room (220) is provided in the incised surface (230) while being spaced at a predetermined distance apart from the slit (210), an auxiliary slit (221) is formed in the room (220) to pass therethrough to communicate with the suction body (100), and a pattern roller (300) is mounted in the room (220) to rotate in place while partially protruding outward from the incised surface (230) so as to form patterns on a surface of fleeces F which have passed through the slit (210).

An outer surface of the pattern roller (300) may include at least one of patterns including splines formed to be lengthwise in a longitudinal direction of the pattern roller (300) while each spline is cut to a certain length, patterns including several annular protrusions formed at predetermined intervals on an outer circumference of the pattern roller (300), spline-shaped patterns formed to be lengthwise in the longitudinal direction of the pattern roller (300), and lattice-shaped patterns including repeated uneven parts.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIGS. 4A and 4B are views illustrating all of the components of the backwash suction device according to Embodiment 1 of the present invention in which FIG. 4A is a front view and FIG. 4B is a cross-sectional view taken along line A-A in FIG. 4A;

DETAILED DESCRIPTION OF THE INVENTION

Figure 1:
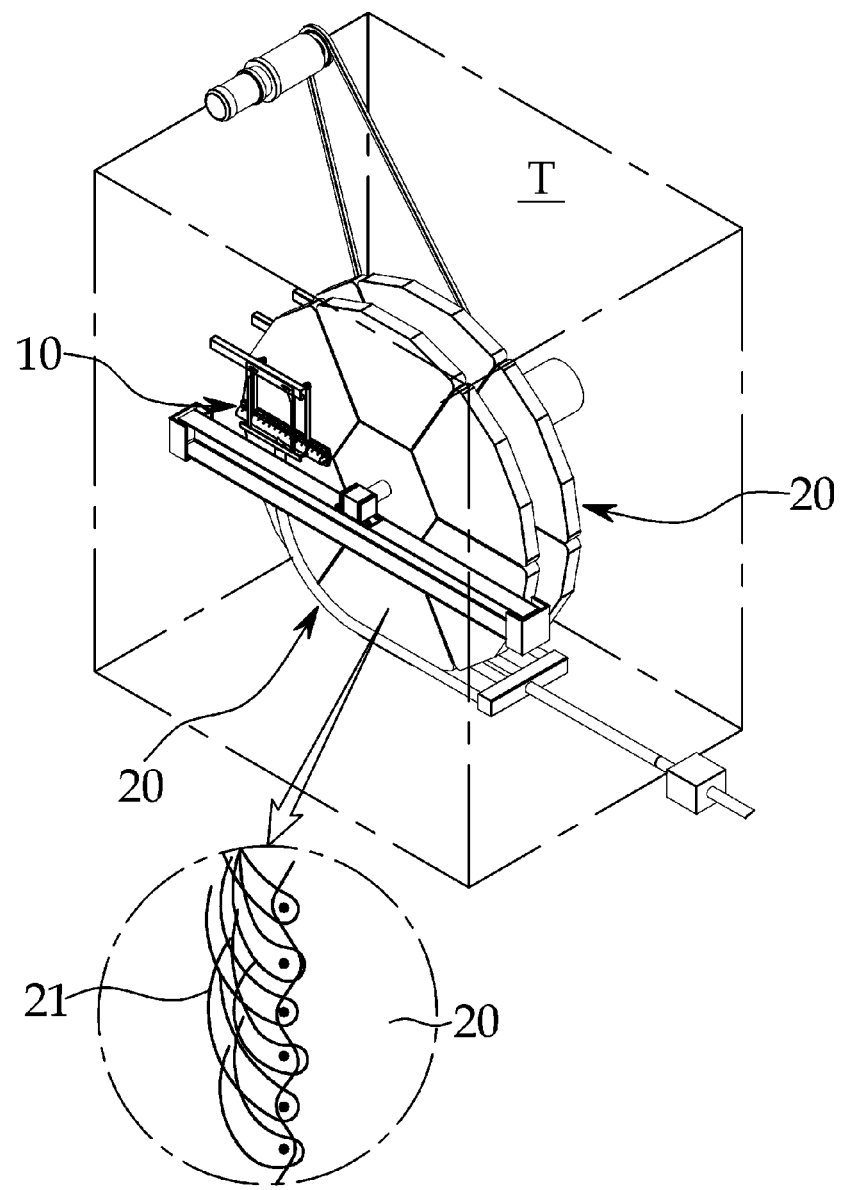
FIG. 1 is a perspective view illustrating an example of a general fibrous filter on which a backwash suction device is mounted.
Figure 2:
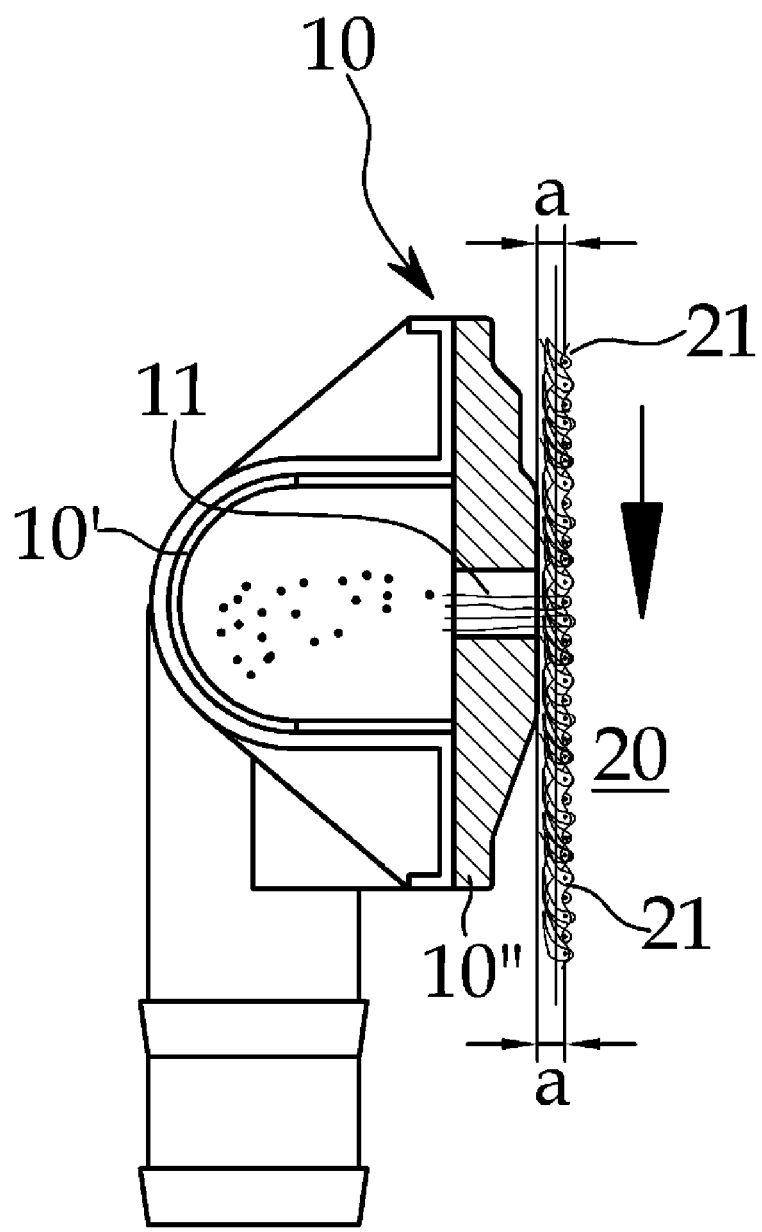
FIG. 2 is a cross-sectional view illustrating components of the backwash suction device of the general fibrous filter.

Hereinafter, an exemplary embodiment of the present invention will be described in detail with reference to the attached drawings. Before this, the terms used in the specification and the claims should not be limited to general or lexical meanings and should be interpreted as meanings and concepts coinciding with the technical concept of the present invention on the basis of a principle in which the inventor can appropriately define the concept of the terms to describe the invention in the best manner Accordingly, since the embodiment disclosed in the specification and components shown in the drawings are merely one of most exemplary embodiments of the present invention and do not represent an entirety of the technical concept of the present invention, it should be understood that a variety of equivalents and modifications capable of substituting the embodiments and the components may be present at the time of filing of the present application.

Embodiment 1

A backwash suction device of a fibrous filter according to Embodiment 1 of the present invention includes a suction body 100 and a suction plate 200 in which a slit 210 is formed as shown in FIGS. 2 to 8C.

Particularly, the suction plate 200 includes an incised surface 230 formed by cutting one surface of outer surfaces to a predetermined thickness W on the basis of the slit 210 so that a space between a disc-type filter D and the suction plate 200 which increases by the thickness W may be secured in which fleeces F which have been backwashed in the slit 210 forms patterns on a fleece surface.

Here, a room 220 is formed by cutting a part of a thickness of the slit 210 in the incised surface 230 and a pattern roller 300 rotating in place is mounted in the room 220 so that certain patterns are formed on the surface of the fleeces F between the suction plate and the disc-type filter D using an outer circumferential surface of the pattern roller 300 to increase a filtration area of the fleeces F accordingly.

Also, the pattern roller 300 is formed to partially protrude outward from the incised surface 230 so as to easily and precisely form the patterns with respect to the surface of the fleeces F between the incised surface 230 and the disc-type filter D.

Meanwhile, a variety of shapes of patterns may be formed on the surface of the fleeces F on an outer circumference of the pattern roller 300. Basically, spline-shaped uneven parts are formed lengthwise to form a spline cut with a predetermined length. In addition, as examples of patterns of the pattern roller 300, there are patterns in which annular protrusions are formed at predetermined intervals on the outer circumference of the pattern roller 300, patterns in which several strands of uneven parts are repeatedly formed like forming a spline in a longitudinal direction on the outer circumference of the pattern roller 300, and patterns in which lattice-shaped uneven parts are repeatedly formed. However, one type of patterns or a combination of two or more patterns may be formed.

Hereinafter, the above components will be described in detail with reference to the attached drawings. Here, reference symbol D refers to a disc-type filter used in a fibrous filter and reference symbol F refers to fleeces formed on the disc-type filter D to substantially filter out foreign matter stuck thereto.

A. Suction Body

Figure 3:
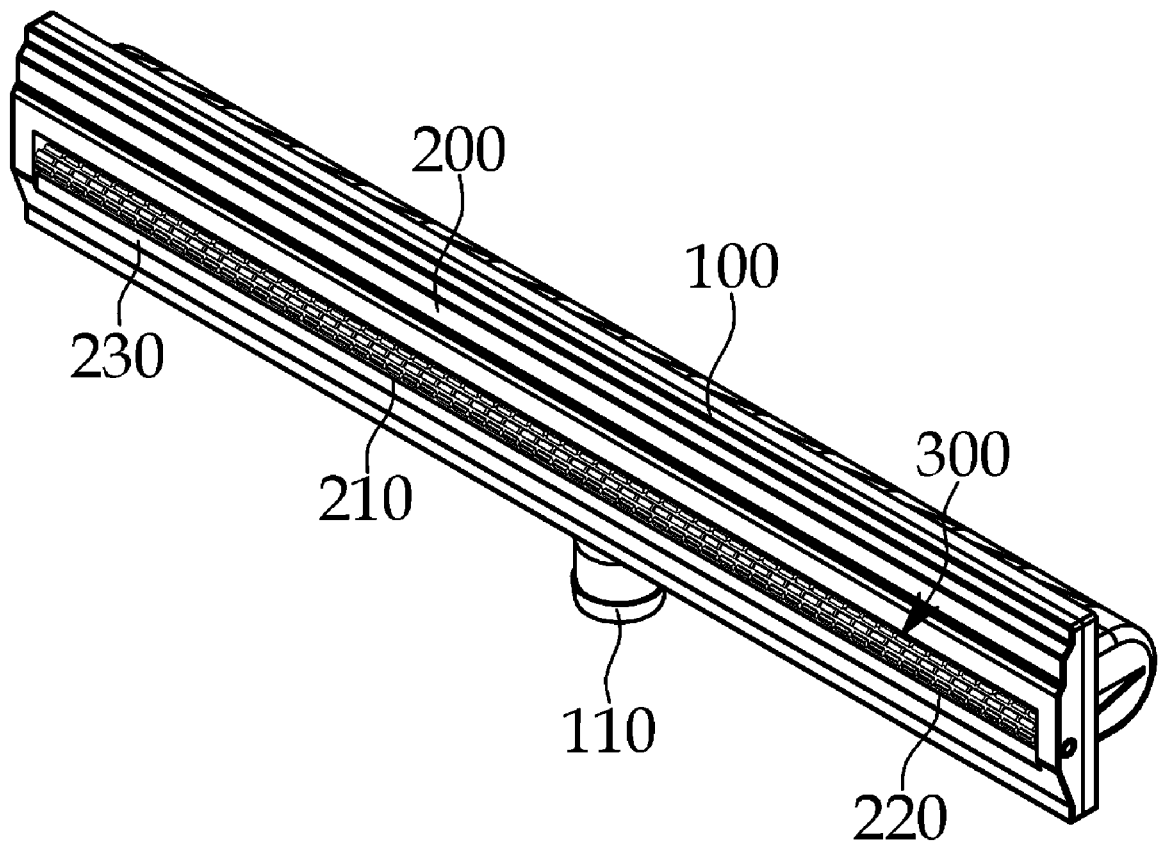
FIG. 3 is a perspective view illustrating all components of a backwash suction device of a fibrous filter according to Embodiment 1 of the present invention.
Figure 4A:
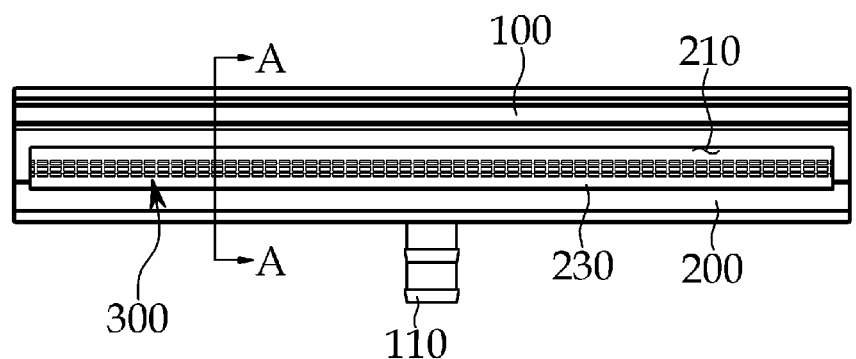
Figure 4B:
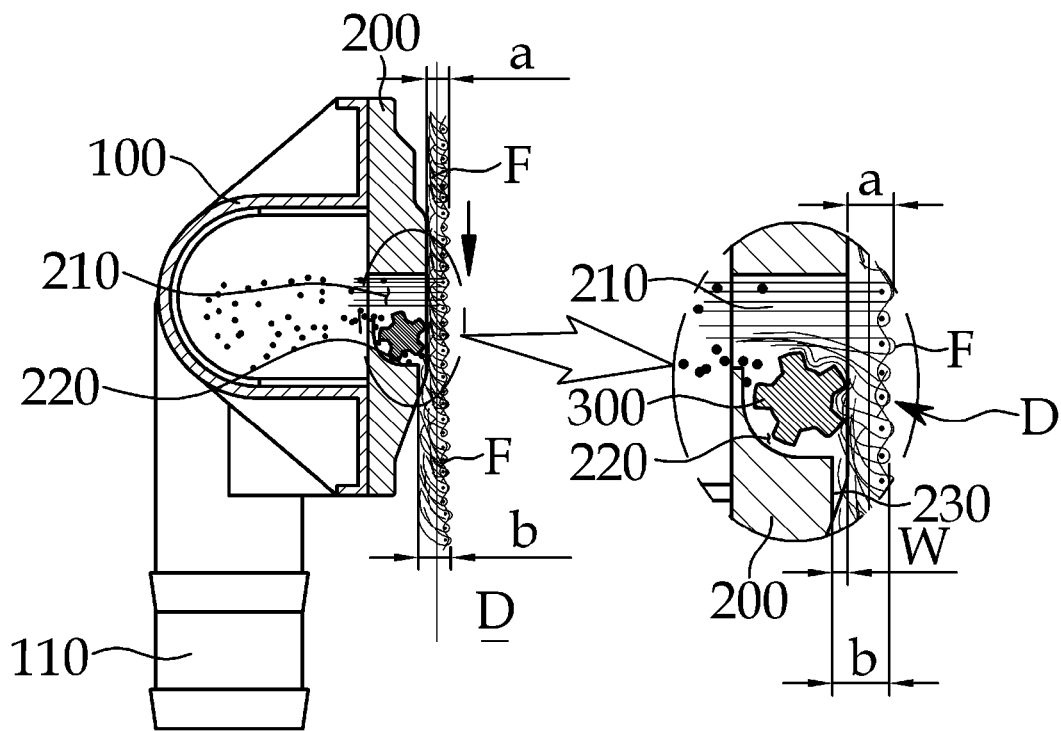
Figure 5:
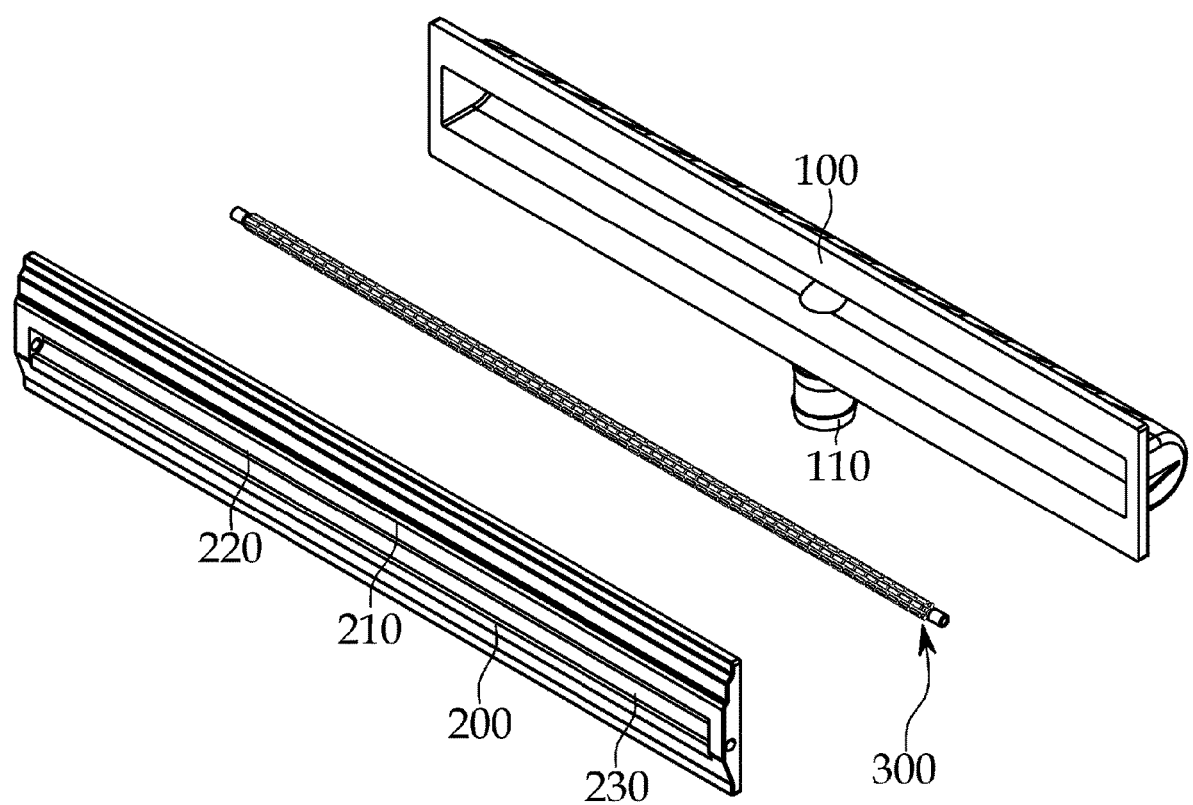
FIG. 5 is an exploded perspective view illustrating all of the components of the backwash suction device of the fibrous filter according to Embodiment 1 of the present invention.
Figure 6:
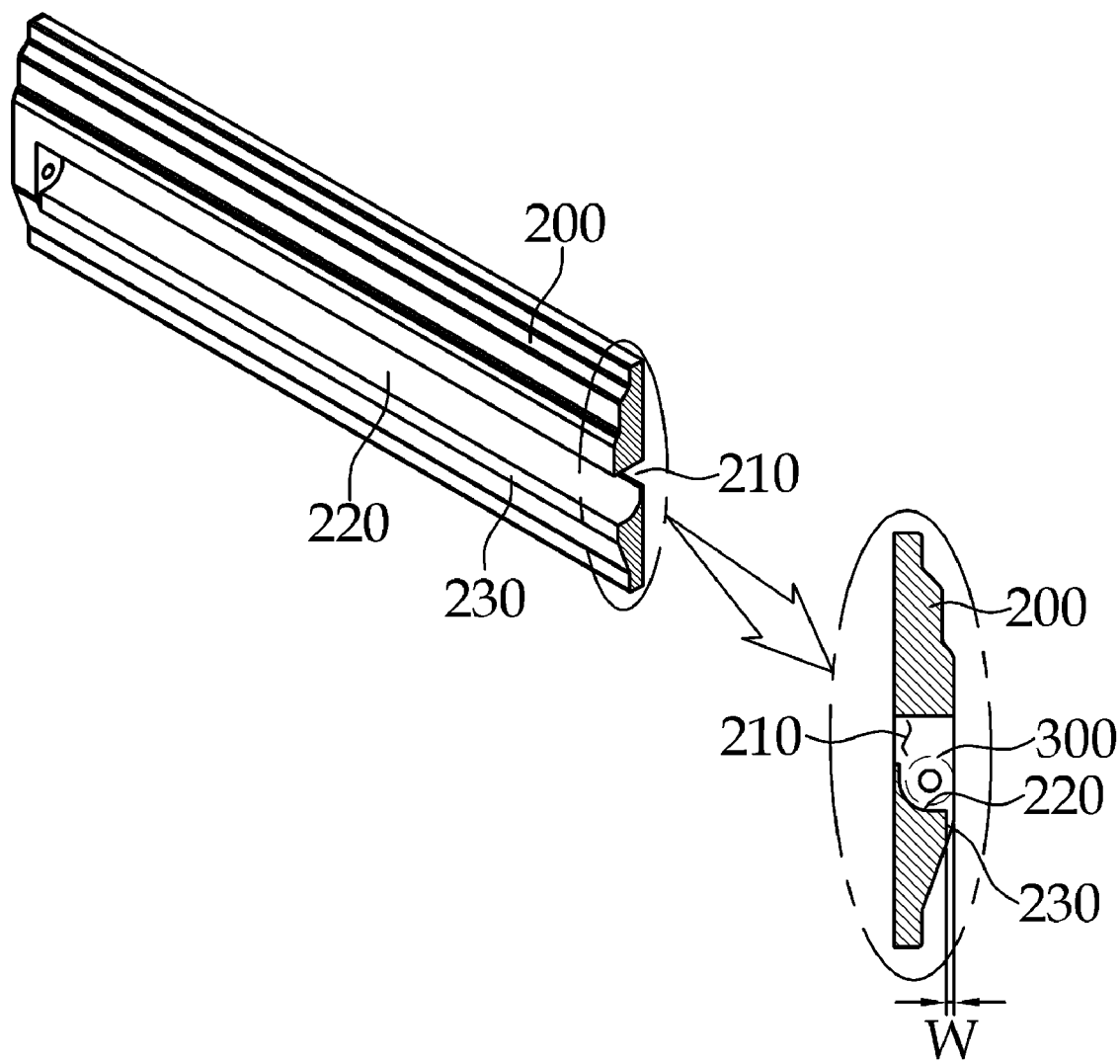
FIG. 6 is a perspective view illustrating components of a suction plate according to Embodiment 1 of the present invention which is shown by cutting a middle part in a longitudinal direction.

As shown in FIGS. 3 to 5, the suction body 100 may be formed to have a container shape so as to discharge foreign matter suctioned in through the suction plate 200 which will be described below and separated from the fleeces F outward from a septic tank. Accordingly, the suction body 100 includes a drain hole 110 configured to discharge the foreign matter separated from the fleeces F outward from the suction body 100. A pump or the like (not shown) is connected to the drain hole 110 so as to drain a fluid with the foreign matter in the suction body 100 outward from the septic tank.

The suction body 100 is formed to have a length that is approximately a radius of the disc-type filter D so as to install the suction body 100 according to the present invention in a radial direction of the disc-type filter D rotating in place in the septic tank. Accordingly, the suction plate 200 mounted on the suction body 100, which will be described below, is pressed against a surface of the disc-type filter D rotating in place so as to perform backwashing.

B. Suction Plate

As shown in FIGS. 3 to 6, the suction plate 200 closes an open inlet portion of the suction body 100. Also, the suction plate 200 is pressed against the surface of the disc-type filter D so as to allow the fleeces F forming the surface of the disc-type filter D to be suctioned in the suction body 100 to be backwashed. Also, since the pattern roller 300 which will be described below is mounted on the suction plate 200 so as to form predetermined patterns on the surface of the fleeces F which have been backwashed through the slit 210, a filtration area of the fibrous filter is increased and thus filtration efficiency is further increased.

As shown in FIGS. 3 to 6, the suction plate 200 includes the slit 210, the room 220, and the incised surface 230.

1. Slit

As shown in FIGS. 3 to 6, the slit 210 is formed lengthwise in one surface of the suction plate 200 along a longitudinal direction. Here, since the slit 210 is formed with a length of approximately a radius of the disc-type filter D, the slits 210 are disposed to face each other in a radial direction so as to allow the fleeces F formed on the surface of the disc-type filter D to be suctioned in the slit 210 according to rotation of the disc-type filter D to perform a backwash of removing foreign matter stuck to the fleeces F.

In an exemplary embodiment of the present invention, although one slit 210 is shown as being formed on the suction plate 200, as an example, in FIGS. 3 to 6, it should be easily seen by those skilled in the art that two or more slits may be formed.

2. Incised Surface

As shown in FIGS. 4A and 4B, the incised surface 230 is formed on an outer surface of the suction plate 200, that is, a surface exposed outward when the suction plate 200 is mounted on the suction body 100. Here, the incised surface 230 is formed by cutting any one of both surfaces on the basis of the slit 210, and most preferably, a surface surpassed by the fleeces F which have been backwashed in the slit 210 with the predetermined thickness W. That is, since the suction plate 200 is installed to be almost pressed against the disc-type filter D, the fleeces F before being backwashed in the slit 210 are laid flat due to a narrower pre-gap a between the suction 200 and the disc-type filter D. Accordingly, in the present invention, since the incised surface 230 is formed to have the certain thickness W as described above, a post-gap b between the incised surface 230 and the disc-type filter D is wider than the pre-gap by as much as the thickness W of the incised surface 230. The post-gap b provides an adequate space for easily forming patterns when the pattern roller 300 which will be described below forms the patterns on the surface of the fleeces F.

3. Room

As shown in FIGS. 3 to 6, the room 220 is formed by cutting a part of the thickness of the slit 210 in which the incised surface 230 is formed. Here, the pattern roller 300 which will be described below is mounted in the room 220 and is formed to have a size so as to naturally rotate in place without interference between the pattern roller 300 and other components while the pattern roller 300 rotates in place and forms the patterns on the surface of the fleeces F.

In an exemplary embodiment of the present invention, as shown in FIGS. 4A to 6, the room 220 is formed to be parallel to the slit 210 so that the patterns may be formed with respect to the fleeces F withdrawn from the slit 210 after being backwashed.

C. Pattern Roller

As shown in FIGS. 3 to 5, the pattern roller 300 is mounted in the room 220 to rotate in place on the basis of a shaft 300'. Here, since the pattern roller 300 includes predetermined patterns on the outer circumference thereof, the patterns are formed on the surface of the fleeces F of the disc-type filter D rotating while being pressed against the pattern roller 300 and a surface area of the surface of the fleeces F, that is, the filtration area, is increased accordingly so that filtration efficiency of the disc-type filter D may be increased. Here, the surface of the fleeces F refers to a surface formed of the fleeces F which are backwashed while being laid aside between the suction plate 200 and the disc-type filter D and passing through the slit 210 and then collapsing as one flat surface while moving into a space between the suction plate 200 and the disc-type filter D.

Figure 7:
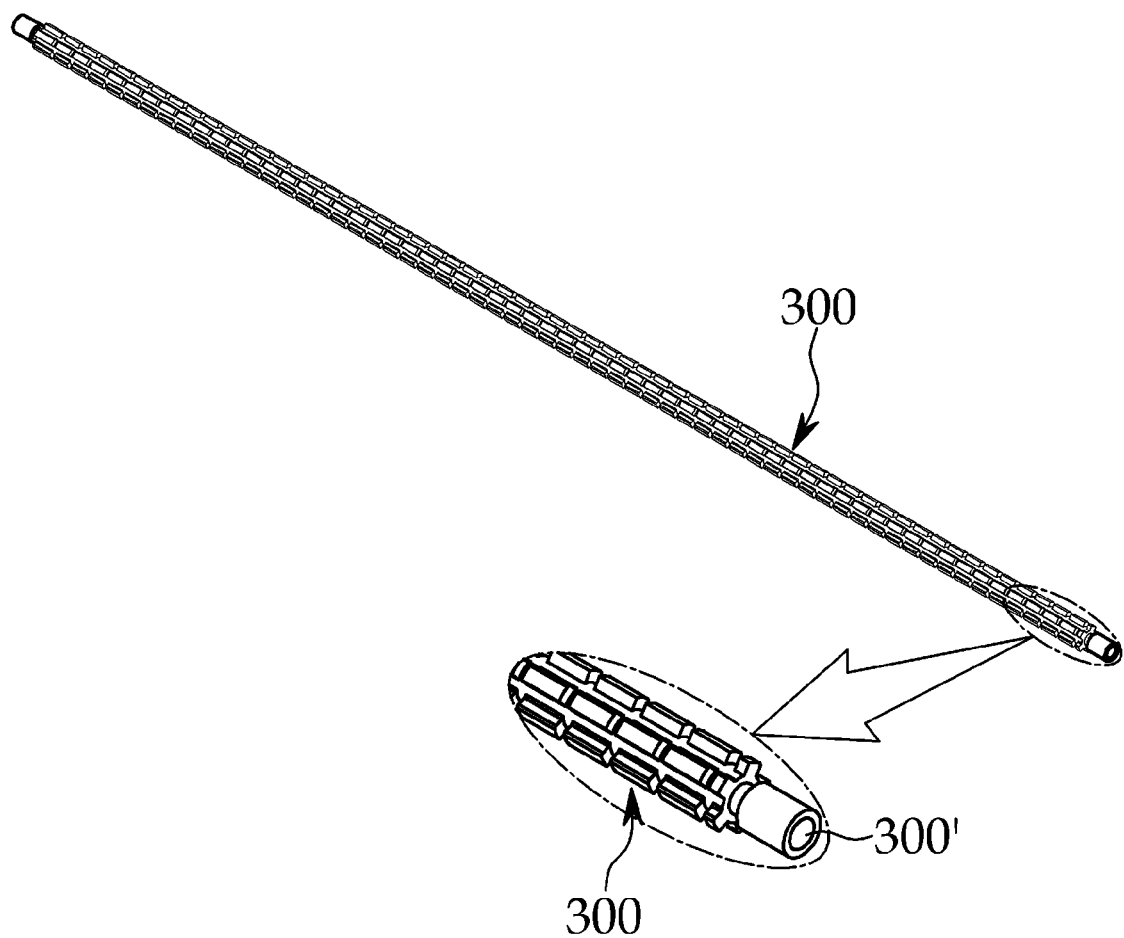
FIG. 7 is a perspective view illustrating components of a pattern roller according to Embodiment 1 of the present invention.
Figure 8A:
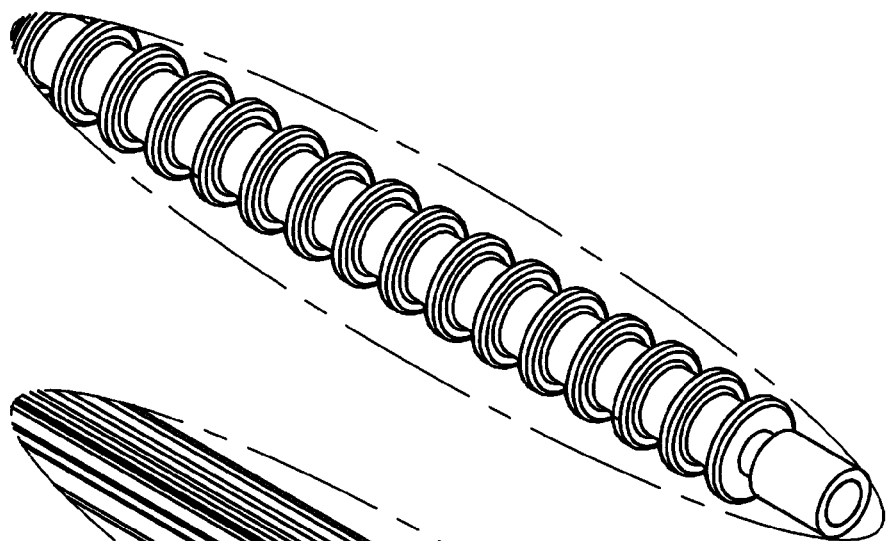
FIGS. 8A to 8C are perspective views of a modified example illustrating a part of the pattern roller according to Embodiment 1 of the present invention.
Figure 8B:
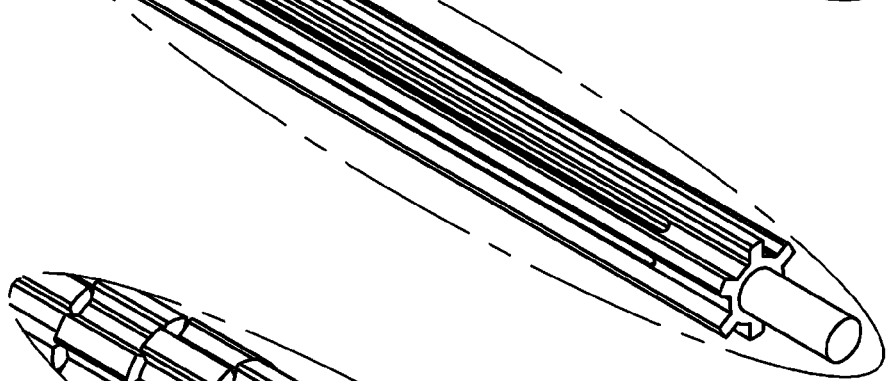
Figure 8C:
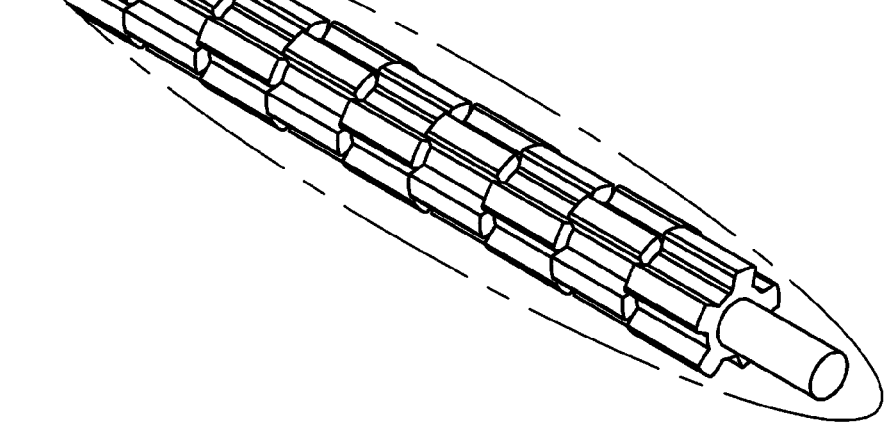

The outer circumference of the pattern roller 300 is configured to form a variety of shapes of patterns on the surface of the fleeces F as shown in FIGS. 7 to 8. For example, the patterns include spline-shaped uneven parts as shown in FIG. 7 while the patterns may be formed so that splines are cut with a predetermined length or the patterns may be formed as a vertically lengthwise groove using annular protrusions formed on the outer circumference of the pattern roller 300 at predetermined intervals as shown in FIG. 8A. Also, several strands of uneven parts may be repeatedly formed like forming splines on the outer circumference of the pattern roller 300 in a longitudinal direction as shown in FIG. 8B or lattice-shaped uneven parts may be repeatedly formed as shown in FIG. 8C. However, it may be easily seen by those skilled in the art that one of these patterns may be used or a combination of two or more of the patterns may be used. Also, a variety of additional patterns may be formed on the outer circumference of the pattern roller 300.

Meanwhile, in an exemplary embodiment of the present invention, as shown in FIG. 4A, the pattern roller 300 may be mounted in the room 220 to partially protrude outward further than the incised surface 230. This is to further increase the filtration area by forming the predetermined patterns to be deep in the surface of the fleeces F which are backwashed in the slit 210 and then surpassing the incised surface 230 using the pattern roller 300 protruding further than the incised surface 230.

In the present invention, since the pattern roller rotating in place is mounted on the incised surface formed in the surface of the suction plate surpassing the slit, the fleeces which are backwashed in the slit surpasses the pattern roller, and the predetermined patterns are formed thereon between the incised surface and the disc-type filter so that the filtration area of the fibrous filter is increased accordingly using the patterns formed on the fleece surface as the fleeces pass the suction plate and thus a filtration effect is increased.

Also, since the filtration area is increased, suspended matter may be further removed accordingly. In another aspect, in comparison to related arts, a volume of a filter is reduced and a site necessary for installation is made smaller.

Embodiment 2

Figure 9:
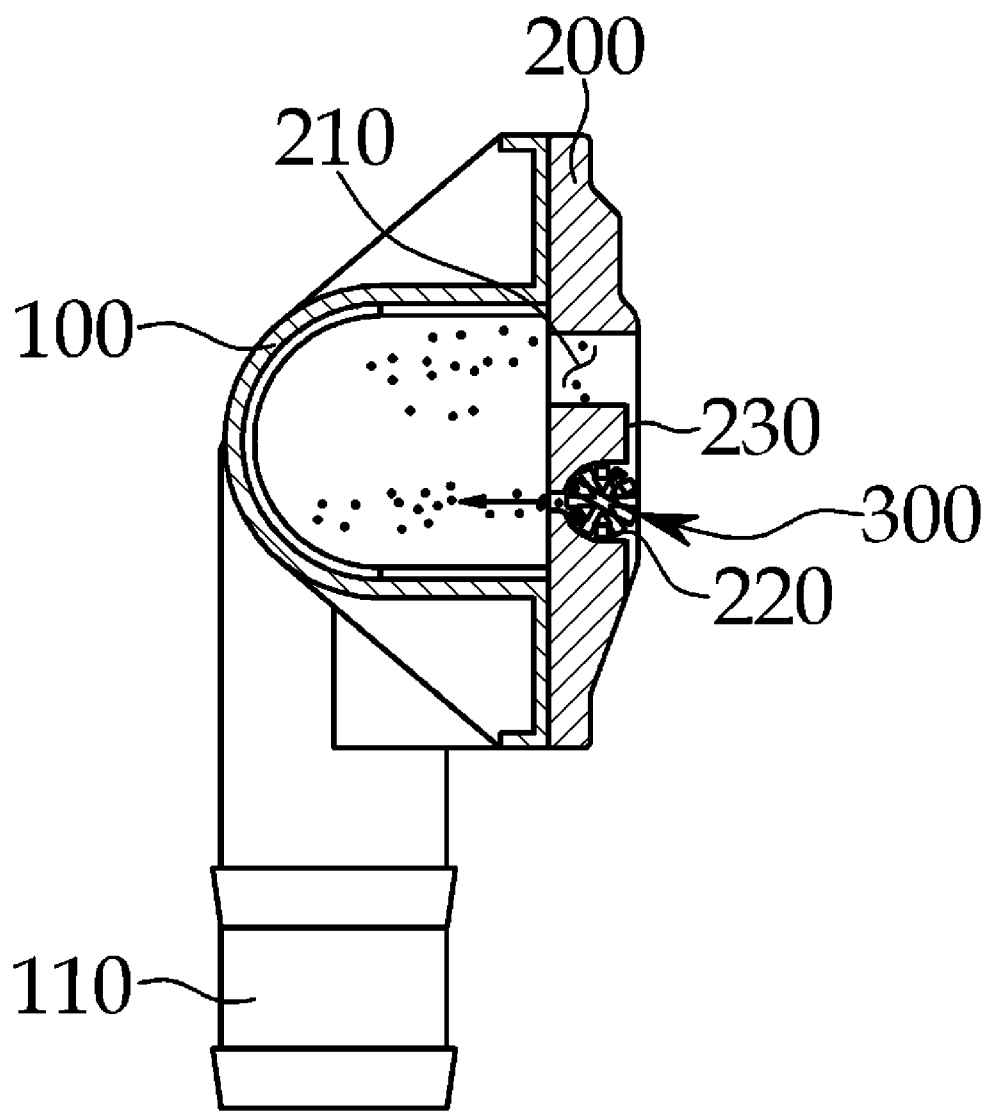
FIG. 9 is a cross-sectional view illustrating a backwash suction device according to Embodiment 2 of the present invention.
Figure 10:
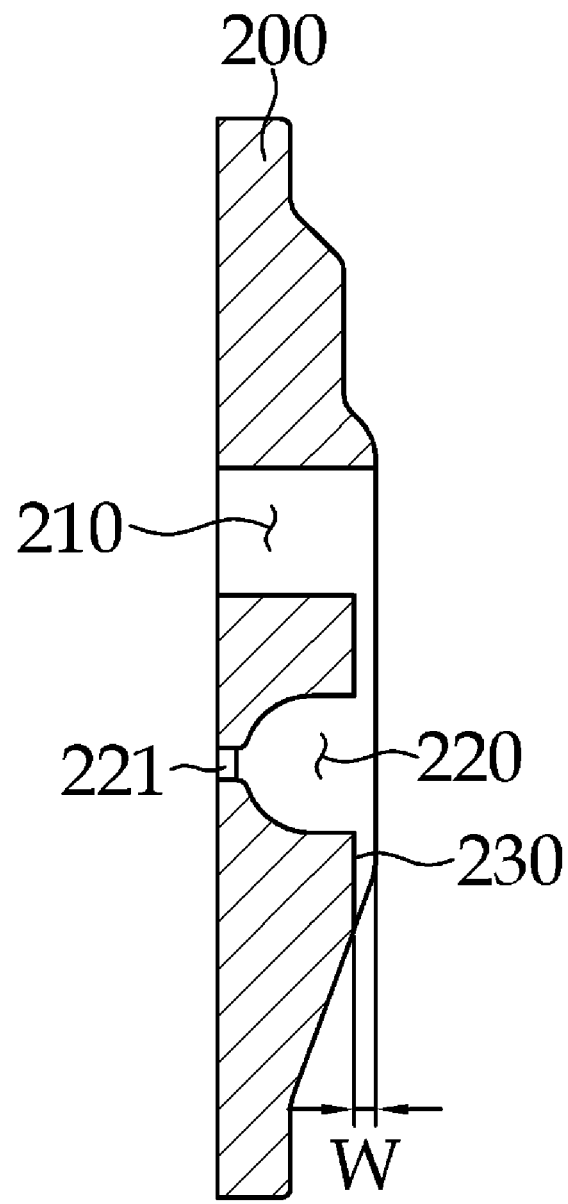
FIG. 10 is a cross-sectional view illustrating components of a suction plate according to Embodiment 2 of the present invention.

As shown in FIGS. 9 and 10, a backwash suction device of a fibrous filter according to Embodiment 2 of the present invention has the same components as in Embodiment 1 but has a slight difference in components of the room 220. Hereupon, a detailed description on the same components as those of Embodiment 1 will be omitted and only differences will be described herein.

In Embodiment 2, as shown in FIGS. 9 and 10, like Embodiment 1, the room 220 in which the pattern roller 300 is mounted is formed in the incised surface 230 formed in any one side of the suction plate 200 exposed outward on the basis of the slit 210. Here, the room 220 is formed to be spaced at a predetermined interval apart from the slit 210 and an auxiliary slit 221 is formed in the room 220 to pass therethrough to communicate with an inside of the suction body 100.

Like Embodiment 1, the room configured as described above also allows the patterns to be formed on the fleece surface backwashed in the slit and hung across a part of the incised surface between the slit and the room using the pattern roller mounted in the room so as to increase the filtration area of the disc-type filter.

A backwash suction device of a fibrous filter according to the present invention provides the following effects.

(1) Since an incised surface is formed by cutting one side of an outer surface of a suction plate on the basis of a slit to a predetermined thickness and a pattern roller is installed in a room, which is provided at a thickness part of the slit in which the incised surface is formed, to rotate in place, patterns are formed on a surface of fleeces which are backwashed while passing through the slit and then pushed between the suction plate and a disc-type filter using the pattern roller so that a filtration area of a fleece surface may be increased and consequentially filtration efficiency of a fibrous filter may be increased.

Also, since the filtration area is increased, floating matter may be further removed accordingly. In another aspect, in comparison to related arts, a volume of a filter is reduced and a site necessary for installation is reduced.

(2) Here, since the room is formed at a location spaced at a predetermined distance apart from the slit in the incised surface and an auxiliary slit is formed to pass through a bottom of the room, backwash may be performed using the room, and the patterns may be formed on the fleece surface of the disc-type filter using the pattern roller mounted in the room so that the filtration area may be increased and thus filtration efficiency of the fibrous filter may be further increased.

(3) Here, since the incised surface provides an adequate space between the suction plate and the disc-type filter so as not to allow the patterns formed on the fleece surface pressed against the disc-type filter to be pushed again, the patterns formed on the fleece surface using the pattern roller may remain in shape so as to increase a filtration area.

(4) Accordingly, since the pattern roller mounted in the room is mounted to protrude outward by a certain thickness further than the incised surface, desired patterns may be easily formed on the fleece surface using a protruding part of the pattern roller so as to increase filtration efficiency of the fibrous filter.

(5) Meanwhile, anything capable of increasing a filtration area by forming certain patterns on the fleece surface of the disc-type filter may be used on an outer surface of the pattern roller. As the patterns, for example, there are patterns including splines formed to be lengthwise in a longitudinal direction thereof while each spline is cut to a certain length, patterns including several annular protrusions formed at predetermined intervals on an outer circumference of the pattern roller, spline-shaped patterns formed to be lengthwise in a longitudinal direction on an outer circumferential surface, and lattice-shaped patterns including repeated uneven parts. Also, one type of patterns may be used or a combination of two or more types of patterns may be used as the patterns.

What is claimed is:

1. A backwash suction device of a fibrous filter, comprising:
    a suction body having a container shape and including a drain hole to discharge content from inside the suction body outward; and
    a suction plate mounted in the suction body to close an inlet part thereof and including a slit formed to perform backwash,
    wherein an incised surface is formed in the suction plate by cutting one side of a surface exposed outward on the basis of the slit to a predetermined thickness, a room is provided by cutting a part of a thickness of the slit in which the incised surface is formed, and a pattern roller is mounted in the room to rotate in place while being partially exposed and protruding outward from the incised surface so as to form patterns on a surface of fleeces which have passed through the slit.

2. The backwash suction device of a fibrous filter according to claim 1, wherein an outer surface of the pattern roller comprises at least one of:
    patterns including splines formed to be lengthwise in a longitudinal direction of the pattern roller while each spline is cut to a certain length;
    patterns including several annular protrusions formed at predetermined intervals on an outer circumference of the pattern roller;
    spline-shaped patterns formed to be lengthwise in the longitudinal direction of the pattern roller; and
    lattice-shaped patterns including repeated uneven parts.

3. A backwash suction device of a fibrous filter, comprising:
    a suction body having a container shape and including a drain hole to discharge content from inside the suction body outward; and
    a suction plate mounted in the suction body to close an inlet part thereof and including a slit formed to perform backwash,
    wherein an incised surface is formed in the suction plate by cutting one side of a surface exposed outward on the basis of the slit to a predetermined thickness, a room is provided in the incised surface while being spaced at a predetermined distance apart from the slit, an auxiliary slit is formed in the room to pass therethrough to communicate with the suction body, and a pattern roller is mounted in the room to rotate in place while being partially exposed and protruding outward from the incised surface so as to form patterns on a surface of fleeces which have passed through the slit.

4. The backwash suction device of a fibrous filter according to claim 2, wherein an outer surface of the pattern roller comprises at least one of:
    patterns including splines formed to be lengthwise in a longitudinal direction of the pattern roller while each spline is cut to a certain length;
    patterns including several annular protrusions formed at predetermined intervals on an outer circumference of the pattern roller;
    spline-shaped patterns formed to be lengthwise in the longitudinal direction of the pattern roller; and
    lattice-shaped patterns including repeated uneven parts.

* * * * *